(12) United States Patent
Sween et al.

(10) Patent No.: US 7,496,697 B2
(45) Date of Patent: Feb. 24, 2009

(54) APPARATUS FOR MANAGING MULTIPLE COMPUTERS BY REMOTE CONTROL

(75) Inventors: Barry Sween, Santa Monica, CA (US); Yoko Iida, Los Angeles, CA (US)

(73) Assignee: Belkin International, Inc., Compton, CA (US)

( * ) Notice: Subject to any disclaimer, the term of this patent is extended or adjusted under 35 U.S.C. 154(b) by 47 days.

(21) Appl. No.: 11/566,119

(22) Filed: Dec. 1, 2006

(65) Prior Publication Data

US 2008/0129692 A1    Jun. 5, 2008

(51) Int. Cl.
G06F 3/00    (2006.01)
G06F 13/00    (2006.01)

(52) U.S. Cl. .............................. 710/38; 710/31; 710/62; 710/72; 710/106; 710/313; 710/316; 715/718

(58) Field of Classification Search ............. 710/13–19, 710/31–34, 36–47, 62–64, 72–73, 106, 313–317; 709/223; 715/716–719
See application file for complete search history.

(56) References Cited

U.S. PATENT DOCUMENTS

| | | | |
|---|---|---|---|
| 6,671,756 B1 * | 12/2003 | Thomas et al. ................ | 710/73 |
| 6,802,010 B1 * | 10/2004 | Kim et al. ..................... | 726/20 |
| 2004/0177264 A1 * | 9/2004 | Anson et al. ................. | 713/200 |
| 2004/0181590 A1 * | 9/2004 | Liou et al. ................... | 709/217 |
| 2005/0216620 A1 * | 9/2005 | Sandulescu et al. ........... | 710/62 |
| 2006/0064509 A1 * | 3/2006 | Chen ........................... | 709/250 |
| 2007/0011715 A1 * | 1/2007 | Hsuan ......................... | 725/133 |
| 2007/0022176 A1 * | 1/2007 | Kobayashi ................... | 709/217 |
| 2007/0083619 A1 * | 4/2007 | Chen et al. ................... | 709/218 |
| 2007/0088876 A1 * | 4/2007 | Chen ........................... | 710/67 |
| 2008/0036741 A1 * | 2/2008 | Hsieh et al. .................. | 345/168 |

* cited by examiner

Primary Examiner—Christopher B Shin
(74) Attorney, Agent, or Firm—O'Melveny & Myers LLP (57) ABSTRACT

A computer management apparatus is provided for interconnecting a single user console including user interface devices, such as a console keyboard, a console video display unit, a console mouse, and speakers for connecting to a plurality of host computers, thereby allowing the user to access one or more of the host computers from the user console. In one embodiment, the user may easily switch between the host computers by use of an RF wireless remote control device that activates a switching circuit contained within the body of the computer management apparatus. The cables utilized with the apparatus and the device indicator on the remote control device are color coded for easy hook-up and identification of the host computer selected with the remote control device to activate the switching circuit.

24 Claims, 7 Drawing Sheets

APPARATUS FOR MANAGING MULTIPLE COMPUTERS BY REMOTE CONTROL

BACKGROUND OF THE INVENTION

1. Field of the Invention

The present invention relates generally to computer systems, and more particularly to an apparatus for managing, controlling, and/or viewing a plurality of host computers via a remote control device utilizing color coding.

2. Description of Related Art

In many applications, it is advantageous to interconnect a single computer to multiple computers. For example, a keyboard/video/mouse ("KVM") switch is a device that is generally connected to multiple computers ("host computers") in order to enable a single keyboard, video display monitor and mouse to control each of the connected computers. Similarly, there also exists an enhanced version called a keyboard/video/mouse/audio ("KVMA") switch that includes the ability to enable a single set of speakers to be selectively routed to each of the connected computers. In this way, a user may have access to multiple host computers without having to deal with the clutter and space requirements of having separate keyboard, monitor, and mouse for each of the computers. When the user accesses a host computer connected to the KVM switch, video signals are routed from the computer, processed, and displayed on the single video monitor. Generally, in order to be able to access another host computer, the user must physically actuate a button or other mechanism on the KVM switch base. But requiring the user to physically access the KVM switch is adverse to the promotion of easy switching between host computers, particularly if the KVM switch base is bulky or the user has limited space, wherein the KVM switch base needs to be placed in an inconvenient, remote, or inaccessible location, such as on the floor behind the user's desk.

Recently, wireless KVM switches address this need by enabling the multiple host computers to be controlled through wireless connection to the KVM switch. This enables much of the routing of cables interconnecting the computers to the KVM switch to be eliminated. The ability to manage remote computers wirelessly from a single host computer is a key feature in the use of KVM switches that control a large number of host computers with one KVM switch, such as with server rack systems. Such wireless switched KVMs are commercially available utilizing IEEE 802.11x wireless protocols. However, even in consumer-type applications managing as few as two computers with one keyboard, mouse, video display monitor and set of speakers, the KVM switch base is still relatively large.

It is desirable, therefore, to provide a KVM switch that includes a simple, compact remote switching device that can be placed on the user's desk, attached to a computer monitor, or even used from the palm of the user's hand while he or she sits across the room. The use of such a remote control switch, located away from the KVM switch base containing all the interconnection wiring and connectors, would allow for easy interaction with one or more host computers connected to the management device and allow for easy switching of the keyboard, mouse, audio output, and video output from all the computers connected to the management device. The remote switching device can be coupled to the KVM switch base using a single cable or it can be wirelessly coupled to the KVM switch base. There are a few commercially available KVM switches utilizing an infrared ("IR") remote control switch; however, this technology is limited to a direct, straight line-of-sight connection between the IR remote control switch and the KVM switch base.

It is also desirable to provide a KVM switch that is very easy to use and set-up for users that are not very technically savvy. KVM switches by their nature have a large number of wires and cables to be interconnected to the output connectors of the computers to be managed and the KVM switch itself, particularly when the KVM switches have to manage and control a large number of host computers.

SUMMARY OF THE INVENTION

The present invention provides an apparatus for accessing a plurality of host computers from a single console and allowing a user to remotely switch the keyboard, video signal, mouse and audio signals from each of the host computers, hence it is called a KVM or KVMA switch. The utilization of a color coding scheme applied to the cables and wires connected to the KVMA switch as well as to the computer switching mechanism (and the remote control device) make both the initial set-up and the operation of the KVMA switch easy for even the most technologically challenged user. The utilization of radio frequency ("RF") switching technology offers very reliable connections between an RF remote switch and the KVMA switch base, with the added benefit of the ability to toggle between computers from just about anywhere within the same room as the KVMA switch base and sometimes from another room, given the availability of sufficiently strong RF signal strength.

In one embodiment of the present invention, a computer management apparatus is connected to a console including a single keyboard, mouse, video display monitor, and speakers, to control two host computers. The user may easily switch between the host computers by use of a remote control device. The remote control device may wirelessly connect to the switching circuit contained within the body of the apparatus. There are colored bands on the KVMA switch base that attach to cables connected to the host computers and a device indicator on the remote control device that is color coded. The color coding allows for easy hook-up and identification of the host computer selected by the user depressing a device button on the remote control device. Specifically, the remote control device includes a connection indicator that toggles between different colors, that are color coordinated with the colored bands on the KVMA switch base. This in turn activates the switching apparatus in the body of the computer management apparatus. Alternatively, a multicolored connection indicator on the body of the KVMA switch base and/or the remote control device illuminates in two alternate colors corresponding to the host computer selected by depressing the device button.

In another embodiment of the present invention, the connection indicator illuminates temporarily when the device button on the wireless remote control device is depressed, thereby confirming that a signal has been transmitted to the switching circuit contained within the body of the computer management apparatus.

In yet another embodiment of the present invention, the wireless remote control device utilizes RF switching technology to select between the host computers. As compared to existing infrared remote KVM switches that are limited to line-of-sight communications to the base of the computer management apparatus, a KVM switch utilizing RF switching technology would offer much more reliable connections between an RF wireless remote control and the apparatus base, with the added benefit of the ability to activate the remote consistently from just about anywhere within the same room as the apparatus base.

A more complete understanding of the apparatus for enabling a single user console to remotely manage, control, and view a plurality of host computers will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a apparatus for accessing a plurality of host computers from a single console and allowing a user to remotely switch signals including keyboard, video signal, mouse and audio signals, from each of the host computers ("KVM switch" or "KVMA switch"). For example, the user can easily switch between the host computers by use of an RF wireless remote control device that switches states or modes of the KVMA switch. Color coded cables utilized with the KVMA switch body are color coordinated with the RF remote control device for easy hook-up and utilization of the KVMA switch. In the detailed description that follows, like element numerals are used to indicate like elements appearing in one or more of the figures.

Figure 1A:
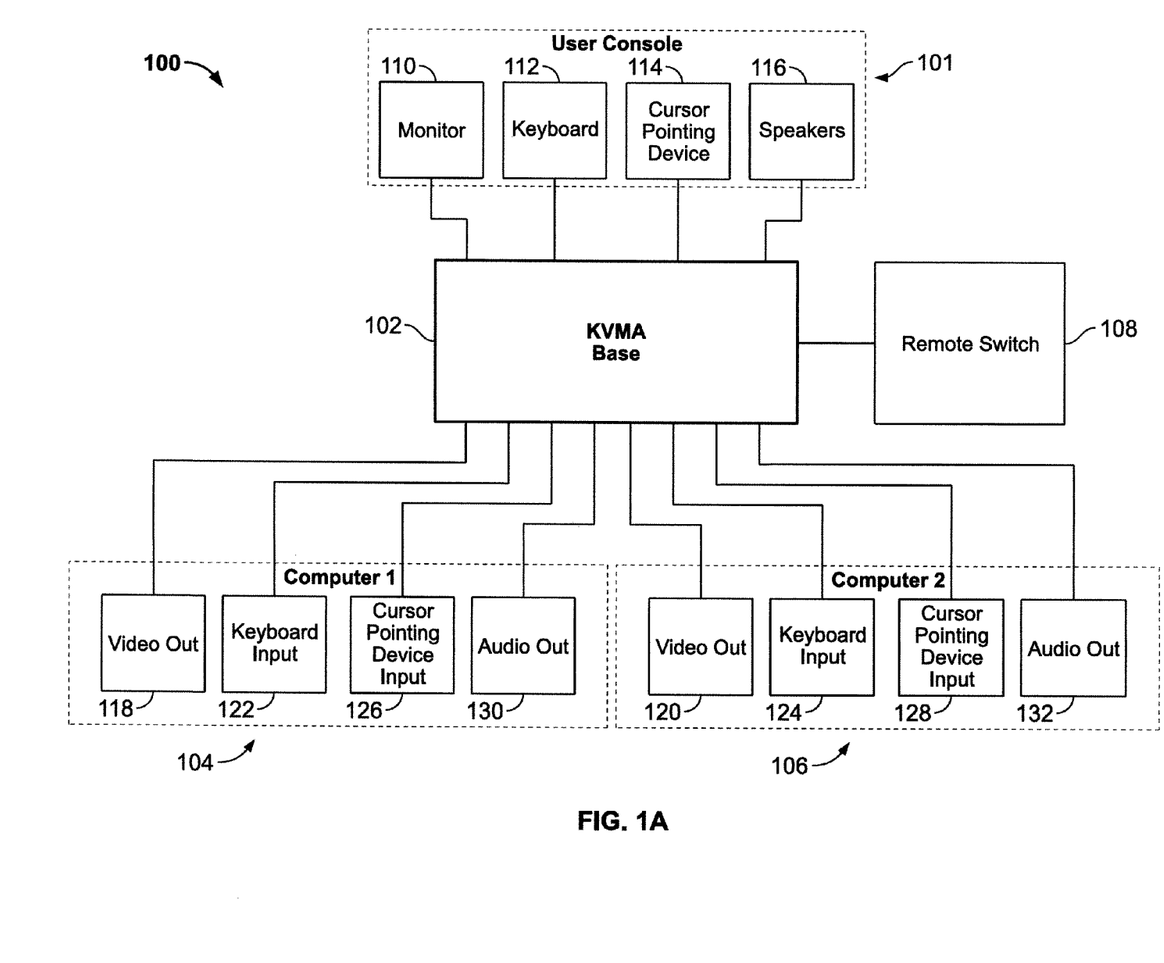
FIG. 1A is a block diagram showing an exemplary system for a KVMA switch with a wired remote switch that provides easy, convenient and intuitive switching between two host computers.

FIG. 1A shows a block diagram of an exemplary system for a keyboard, video, mouse, audio (KVMA) switch apparatus with a wired remote control device that provides easy, convenient and intuitive switching between two computers. In one embodiment of the present invention, computer management system 100 comprises a remote switch or remote control device 108a communicatively coupled to a KVMA switch base or computer management apparatus 102 that is connected between a user console 101 and host computers 104 and 106. The user console 101 has input devices comprising a console video display monitor or display unit 110, a console keyboard 112, a console cursor pointing device or cursor control device 114, and console speakers or audio reproduction devices 116. The KVMA switch base 102 processes signals from the console keyboard 112 and the console cursor pointing device 114 for use by the appropriate host computer by communicatively coupling them to keyboard inputs or keyboard control signals 122 and 124 and cursor pointing device inputs or cursor control signals 126 and 128, respectively, to the appropriate host computer selected by the user, e.g., host computer 104. Similarly, the KVMA switch base 102 processes the audio out signals or audio signals 132 and 130, as well as the video out signals or video signals 118 and 120, from the host computers 104 and 106, such that audio out signals 130 and 132 and video out signals 118 and 120 respectively, from the appropriate host computer selected, may be heard on speakers 116 and displayed on the console video display monitor 110. Audio and video signals are transmitted through the system 100 from the host computers 104 and 106 to the console 101. Generally, existing video display monitors such as the console video display monitor 110, can receive analog video signals (such as those transmitted under the video graphics array ("VGA") standard), digital video signals (such as those transmitted under the digital video interface-integrated ("DVI-I") standard), or both. Such video monitors may also include a display data channel to transmit monitor information, such as that required under the Video Electronics Standards Association (VESA) DDC2B standard, to the host computers 104 or 106, as selected by the user by use of the remote switch 108a.

Figure 1B:
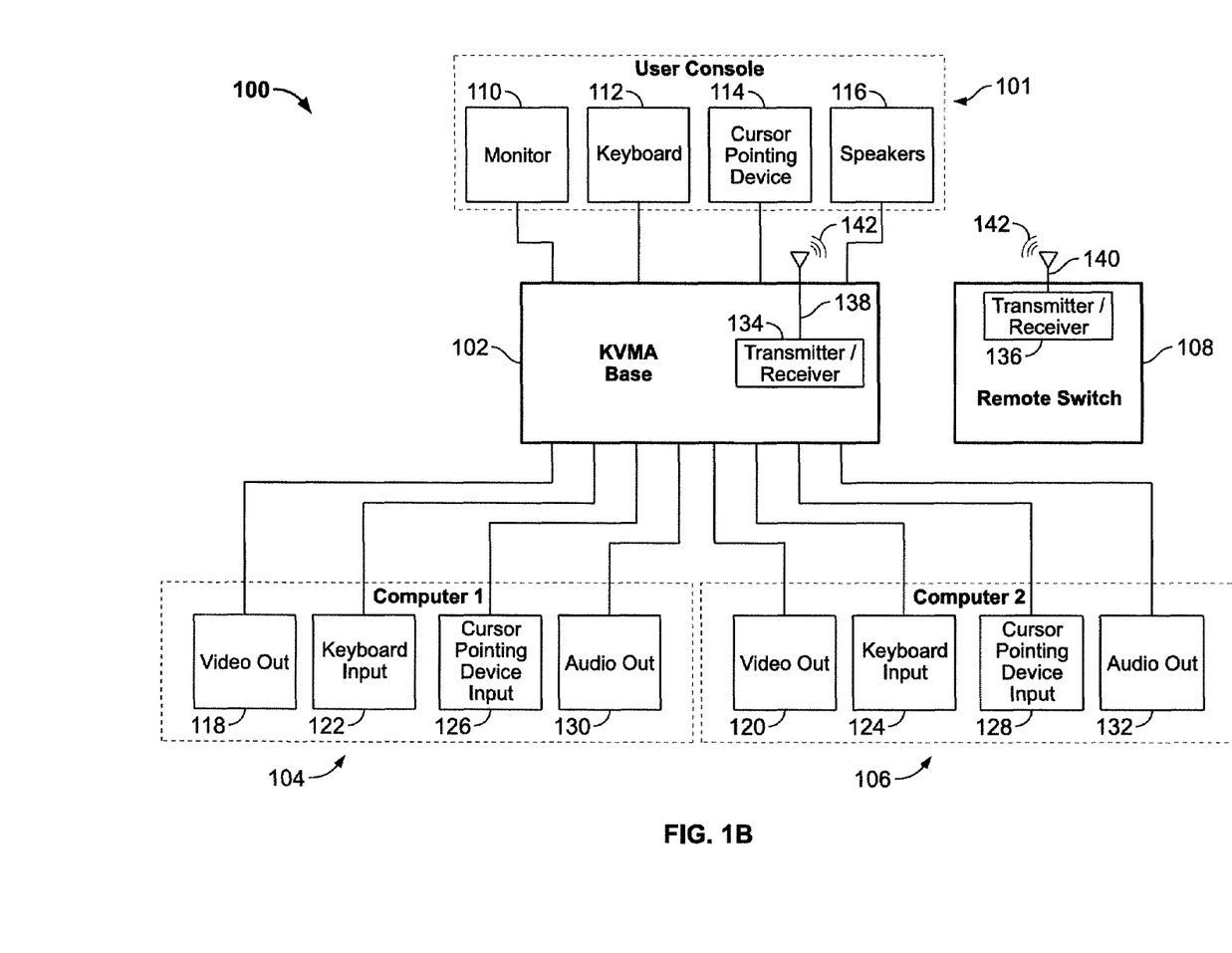
FIG. 1B is a block diagram showing an exemplary system for a KVMA switch with a RF wireless remote switch for provides easy, convenient and intuitive switching between two host computers.

FIG. 1B shows a block diagram of an exemplary system for a keyboard, video, mouse, audio ("KVMA") switch with a wireless RF remote switch 108b that provides easy, convenient and intuitive switching of states or modes of connection between two host computers and the one user console 101. In the embodiment illustrated, system 100 comprising a few additional components than those discussed above, in relation to the embodiment shown in FIG. 1B. Specifically, the KVMA switch base 102 includes a transmitter/receiver circuitry 134 and an internal antenna 138. Similarly, the wireless RF remote switch or wireless remote control device 108b includes a transmitter/receiver 136 and an internal antenna 140. As shown in the embodiment of FIG. 1B, the wireless RF remote switch 108b communicates wirelessly with the KVMA switch base 102 via the transmitter/receiver circuitry 134 operatively coupled to the internal antenna 138 and similarly, the wireless RF remote switch 108b communicates wirelessly with the KVMA switch base 102 via the transmitter/receiver circuitry 136 operatively coupled to the internal antenna 140. Communication between the KVMA base 102 and wireless KVMA remote switch 108b is accomplished by utilizing RF signals that are transmitted and received between each other and illustrated as wireless signals 142. Internally, the KVMA remote switch 108b is a radio frequency switch that selects between the two host computers, selectively coupled to the KVMA switch base 102. One skilled in the art will realize that other protocols and methods of wireless communication between the wireless RF remote switch 108b and the KVMA base 102 are within the scope of the invention.

Figure 2A:
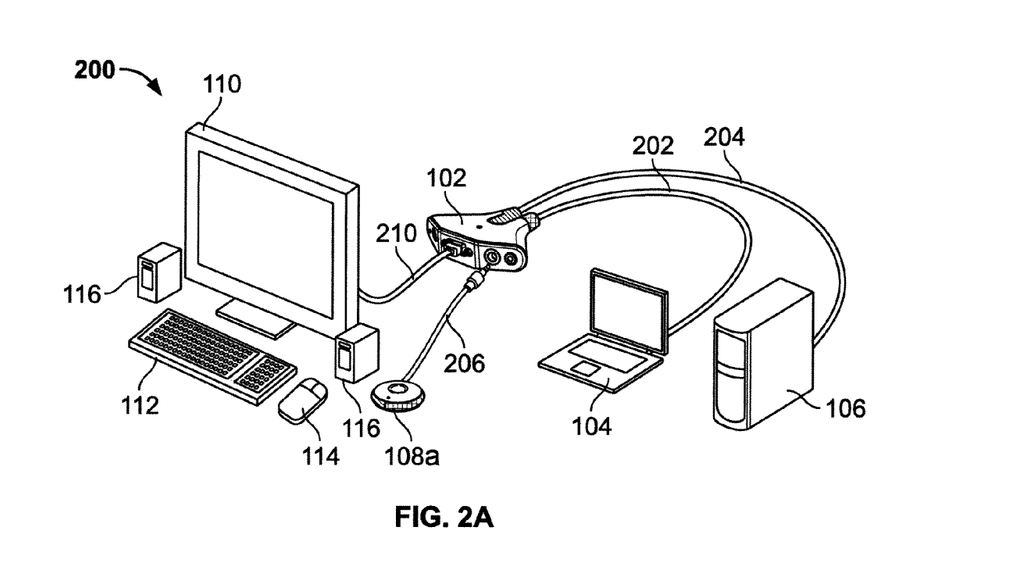
FIG. 2A is a diagram showing a macro view of an exemplary KVMA switch with a wired remote switch managing two host computers.

FIG. 2A is a diagram showing a macro view of the exemplary KVMA base 102 with the wired remote switch 108a managing two host computers in computer management system 200, according to an embodiment of the present invention. The system 200 comprises the KVMA base 102, the host computers 104 and 106, computer cables 202 and 204, a KVMA remote 108a, a remote cable 206 (with a remote control connector on the end that connects to the KVMA base 102), the console video display monitor 110, monitor cable 210, the console speakers 116, the console keyboard 112 and the console cursor pointing device 114. In the embodiment illustrated, the KVMA base 102 has a unique compact triangular shape and is connected to host computers 104 and 106 via host computer cables 202 and 204 respectively. In other embodiments, the KVMA base 102 has other shapes and sizes with the connectors and cables located in different areas of the KVMA base 102.

As illustrated in the embodiment of FIG. 2A, the host computer 104 is a laptop or notebook computer; however, it will be readily apparent to one skilled in the art that the host computer 104 and/or host computer 106 can be almost any type of personal computer that is running an industry standard operating system and has the requisite industry standard compatible connectors and communication protocols. The KVMA remote 108a is connected to the KVMA base 102 via the remote cable 206, that is plugged into the appropriate connector of the KVMA base 102. In the illustrated embodiment of the invention, the console video display monitor 110 can be any display device such as a liquid crystal display ("LCD"), cathode ray tube ("CRT"), or a plasma display with a VGA compatible, 15-pin mini D-SUB connector or a DVI-I connector (also, the DVI-D or DVI-A DVI connector types) developed by an industry consortium, the Digital Display Working Group ("DDWG"). The present invention can be modified to operate with any industry standard compatible display monitor. The console speakers 116 can be any industry standard type computer speakers and allow the user to hear the audio out signals 130 or 132 that correspond to the host computers 104 and 106, selected by the user via the KVMA remote control 108a. The user selects the state or mode of a switching circuit (not shown) within a body of the KVMA base 102. The console cursor pointing device 114 is illustrated as a computer mouse in FIG. 2A; however, one skilled in the art will realize that console cursor pointing device 114 can be embodied by other known human interface devices such as a trackball or touchpad.

Figure 2B:
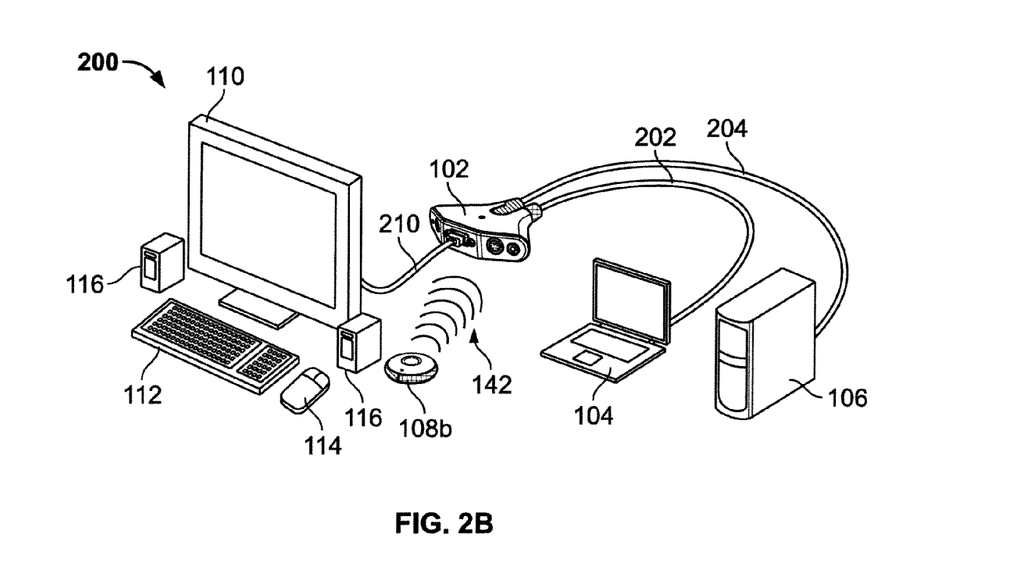
FIG. 2B is a diagram showing a macro view of an exemplary KVMA switch with an RF wireless remote switch managing two host computers.

FIG. 2B is a diagram showing a macro view of the exemplary KVMA base 102 with the wireless remote switch 108b managing two host computers in system 200, according to an embodiment of the present invention. The system 200 comprising the same components as discussed with respect to FIG. 2A above, except that in this embodiment, a wireless RF remote 108b is used in lieu of the wired remote switch 108a and the accompanying remote cable 206. RF switching technology offers reliable connections with the added benefit of the ability to activate the remote consistently from just about anywhere within the same room or in another embodiment with a sufficiently strong RF signal utilized for communications between the wireless RF remote 108b and the KVM switch base 102. This can be quite useful when for instance, the host computer 104 is a desktop computer in a home office and host computer 106 is a media type PC coupled to the user's big-screen plasma television monitor or the like in a living room.

Another benefit of the use of either the wired remote switch 108a or the wireless RF remote switch 108b is that the KVMA base 102 does not need to be physically accessed by the user in order to switch between computers can be placed in an out of the way, hard to access location. The remote switch 108a/108b may be affixed to practically any flat surface with double stick tape, hook and loop fasteners or a variety of other commonly used adherence methods. Placing the KVMA base 102 in an out of sight location would be impracticable with a conventional IR remote switch due to the straight line-of-sight communications limitation.

In yet another variation of the embodiments shown in FIGS. 2A and 2B, the user can selectively connect the connector ports to the host computer 104 and 106 by use of keyboard commands (not shown) entered on the console keyboard 112. The user installs or loads a software program on the host computers 104 and 106 to enable/activate the selective switching of the connector ports of the KVMA cartridge 102 by use of the keyboard commands. The keyboard commands can be a sequence of a plurality of different keys ("Hot Keys") on the console keyboard 112 that the user can assign to a particular combination. In one embodiment, the user can use one or more Hot Keys to toggle between the video out signal 118, keyboard control signal 122, cursor control signal 126, and audio out signal 130 of a first host computer and the video out signal 120, keyboard control signal 124, cursor control signal 128, and audio out signal 132 of a second host computer (shown in FIGS. 1A and 1B). In another embodiment, the user can use one or more Hot Keys to select between: the video out signals 118 and 120; keyboard control signals 122 and 124; cursor control signals 126 and 128; audio out signals 130 and 132; or any combination thereof. Furthermore, it will be understood that the color coding schemes described herein can be modified or expanded upon to accommodate the various combinations of video out signals 118-120, keyboard control signals 122-124, cursor control signals 126-128, and audio out signals 130-132, that can be achieved with the Hot Keys.

Figure 2C:
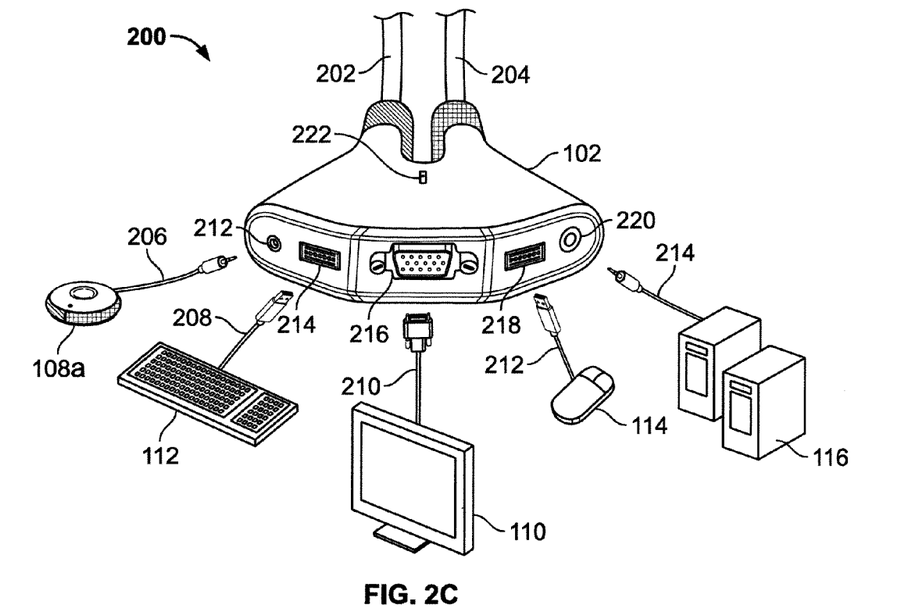
FIG. 2C is a diagram showing an exemplary view of a first end of a KVMA switch base with USB connectors, illustrating the cables, connectors and peripherals comprising a user console that manages, controls and views the host computers.

FIG. 2C is a diagram showing an exemplary view of a first end of the KVMA base 102 with USB connectors, illustrating the cables, connectors and peripherals comprising the user console 101 utilizes to manage, control and view the host computers 104 and 106. In the embodiment, the various connectors that are electrically coupled to peripherals of the user console 101 on the first end of the KVMA base 102 are illustrated. Also shown in FIG. 2C are the computer cables 202 and 204 on a second end of the KVMA base 102 that are electrically connected to the host computers 104 and 106, respectively. On the top portion of the KVMA switch 102 is a light emitting diode ("LED") that provides an indicator light or base indicator 222. The indicator light 222 briefly emits light when the remote switch 108a is activated to indicate that the user console 101 is being switched to communicatively couple a different host computer (i.e., from host computer 104 to 106 or vice versa) and confirming that a switch signal has been activated and received from the remote switch 108a.

In another embodiment, indicator light 222 is a multicolored LED that emits two different colors of light (such as yellow and green) at alternate times to indicate when host computer 104 is selected. For example, a first color may illuminate when the host computer 104 is selected and a second color may illuminate when host computer 106 is selected by the user operating the remote switch 108a. The computer cables 202 and 204 are both colored differently to coordinate with the two alternate colors of the indicator light 222. In other embodiments, the ends of the cable are colored differently from each other and coordinate with the two alternate colors of the indicator light 222. It should be apparent to those skilled in the art that other ways of indicating two different colors that coordinate with the two alternating colors of the indicator light 222 are possible.

In the embodiment illustrated in FIG. 2C, the following exemplary connectors or connector ports are illustrated: a connector 212 is a 1/16" (2.5 mm) mini-jack, connectors 214 and 216 are USB type A connectors, a connector 216 is a VGA compatible, 15-pin mini D-SUB connector, and a connector 220 is a stereo 1/8" (3.5 mm) mini-jack. The wired remote switch 108a is electrically connected to connector 212 by the remote cable 206. Similarly, the console keyboard 112 is electrically coupled to the connector 214 by a cable 208; the console video display monitor 110 is electrically connected to the connector 216 by the monitor cable 210; the cursor pointing device 114 is electrically connected to the connector 218 by a cable 212; and the console speakers 116 are electrically connected to the connector 220 by a cable 214. It should be appreciated that other types of industry standard connectors can be utilized in other embodiments of the present invention, such as the connector 216 may comprise a DVI-I connector instead of a 15-pin mini D-SUB connector.

Figure 3A:
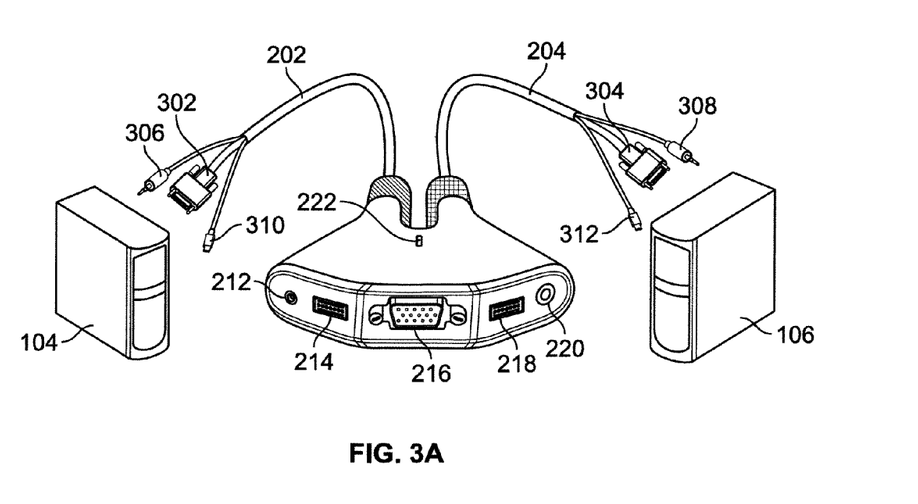
FIG. 3A is a diagram showing an exemplary view of a first end of a KVMA switch base with USB connectors, illustrating the cables that attach to the two host computers to be controlled by the KVMA switch.

FIG. 3A is a diagram showing an exemplary view of the first end of the KVMA base 102 with USB connectors, illustrating the cables that attach to the two host computers 104 and 106 to be controlled by the KVMA switch. In the embodiment illustrated, computer cables 202 and 204 extend out of the body of KVMA base 102 and have identical connectors on the ends that attache to host computers 104 and 106, respectively. Connectors 302 and 304 are video output connectors that allow the video out signals 118 and 120 to be electrically coupled to cables 202 and 204 respectively. Similarly, connectors 306 and 308 allow the audio out signals 130 and 132 to be electrically coupled to cables 202 and 204; and USB connectors 310 and 312 are electrically coupled to both the keyboard inputs or keyboard control signals 122 and 124, as well as to the cursor pointing device inputs 126 and 128. In effect, the KVMA base 102 acts as a switched USB hub with regard to selectively coupling the USB connectors 310 and 312 to the connectors 214 and 216, when the user selects the host computer 104 or 106 with the remote switch 108a.

Figure 3B:
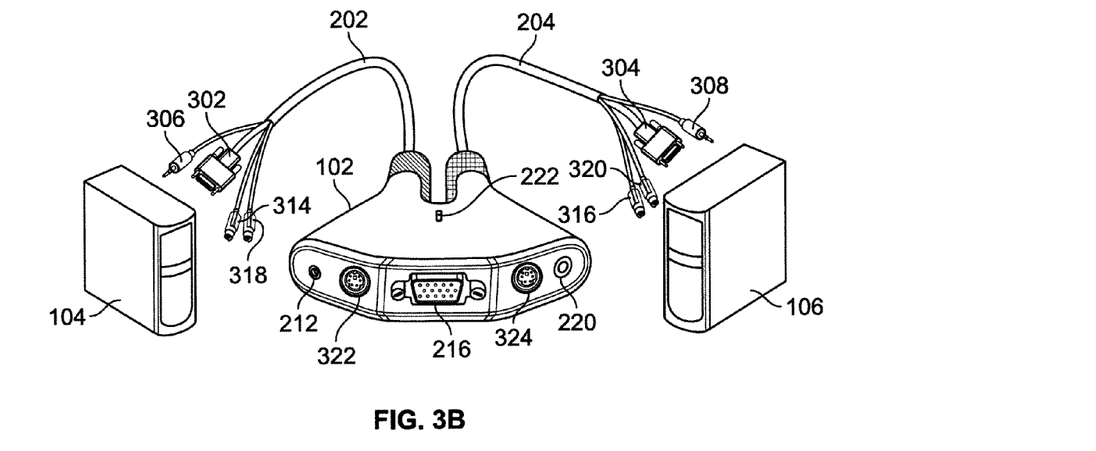
FIG. 3B is a diagram showing an exemplary view of a first end of a KVMA switch base with PS/2 connectors, illustrating the cables that attach to the two host computers to be controlled by the KVMA switch.

One skilled in the art will appreciate that computer cables 202 and 204 can be electrically coupled to host computers 104 and 106 by different types of industry standard connectors and protocols. Accordingly, FIG. 3B is a diagram showing an exemplary layout of the first end of the KVMA base with PS/2 connectors for electrically coupling the host computers 104 and 106 to the computer cables 202 and 204 respectively. In contrast to the use of the USB connectors 310 and 312 to electrically couple to the keyboard inputs 122 and 124 as well as to the cursor pointing device inputs 126 and 128, in the embodiment illustrated, separate PS/2 connectors 314, 316, 318, and 320 are utilized to electrically couple them to the keyboard inputs 122 and 124, as well as to the cursor pointing device inputs 126 and 128, respectively.

Figure 4A:
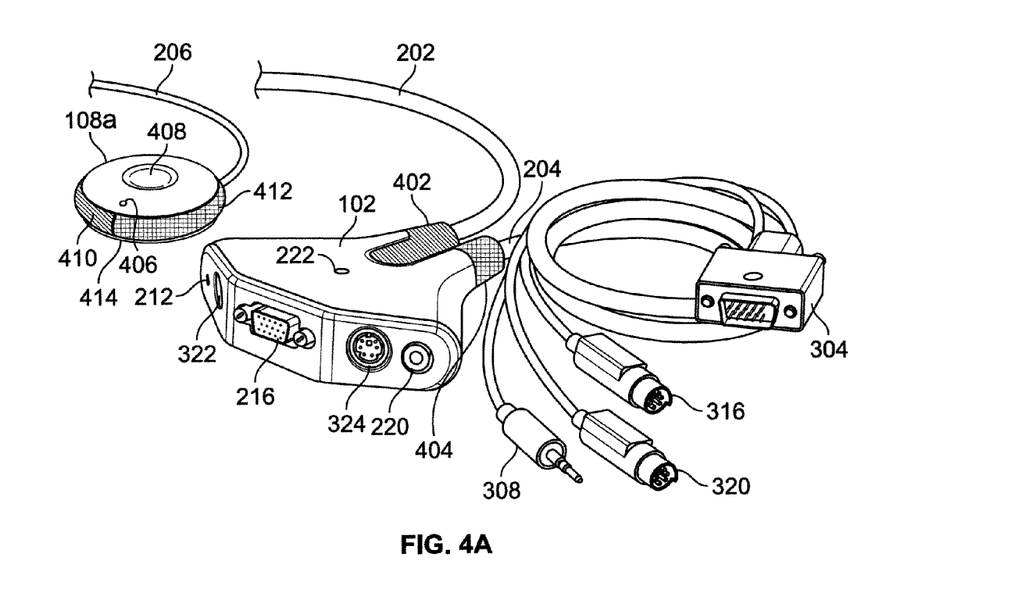
FIG. 4A is a perspective view of an exemplary embodiment of a KVMA switch base with PS/2 connectors and remote switch, showing in detail the cables to be connected to one of the host computers to be controlled by the KVMA switch.
Figure 4B:
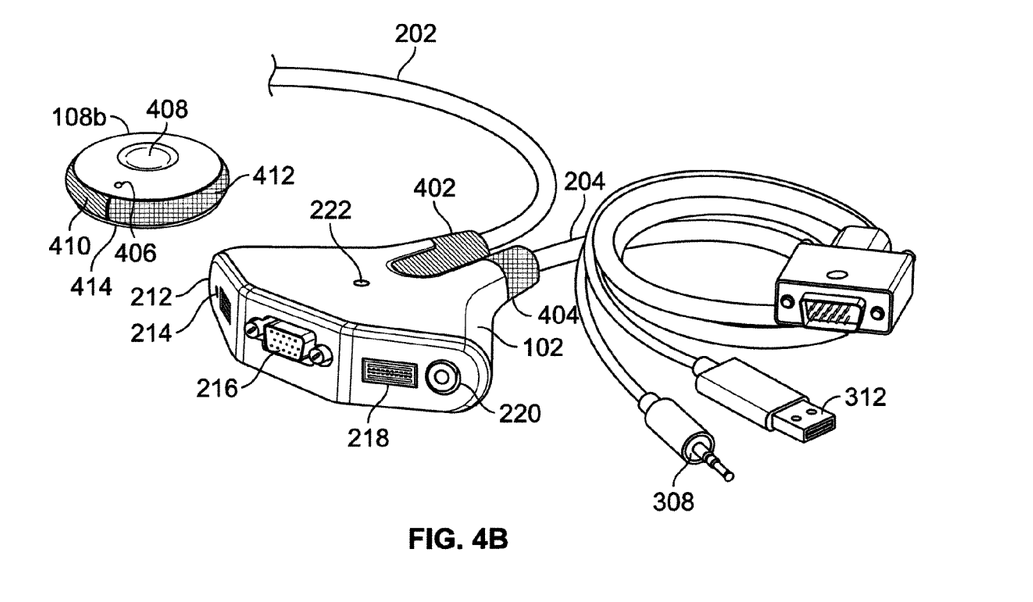
FIG. 4B is a perspective view of an exemplary embodiment of a KVMA switch base with USB connectors and remote switch, showing in detail the cables to be connected to one of the host computers to be controlled by the KVMA switch.

FIGS. 4A and 4B are perspective views of exemplary embodiments of the KVMA base 102 with PS/2 connectors and the wired remote switch 108a in FIG. 4A and with USB connectors and the wireless RF remote switch 108b in FIG. 4B. On the bottom portion of remote switches 108a and 108b is a ring of elastomeric material 414 attached by an adhesive layer to remote switches 108a and 108b that serve as "feet." The elastomeric material 414 helps keep remote switches 108a and 108b from sliding around a flat surface that it is placed upon (such as a desk) while an activation button 408 is depressed. It should be appreciated that other shapes of the elastomeric material that serve as feet for the remote switches 108a and 108b are possible, as well as other choices of materials such as cork or felt. Another possible alternative is the use of hook and loop fasteners on the bottom of remote switches 108a and 108b and a surface the user wishes to adhere it to, such as the side of the console keyboard 112. These figures show in detail the cables to be connected to one of the host computers 104 or 106. In the embodiments illustrated, KVMA base 102 comprising colored bands or color codes 402 and 404 that are coupled to computer cables 202 and 204. The coloration is used to distinguish for the user which cable is connected to which computer and which position of the KVMA switch, corresponding to the same colorization of colored segments 410 and 412 of the remote switch 108a and wireless RF remote switch 108b. In other embodiments, the computer cables 202 and 204 are colored instead of using the colored bands 402 and 404. Other variations are possible, including coloring the connectors 302 and 320 to correspond with the coloration of the colored segments 410 and 412.

The user toggles between the two host computers 104 and 106 to be managed and controlled by user console 101 by pushing the activation button or device button 408 located at the top center of remote switches 108a and 108b. While the activation button 408 is depressed, an indicator light or device indicator 406 located on the top portion of remote switches 108a and 108b temporarily emits light to indicate that communications have been established with the KVMA base 102. As illustrated, indicator light 406 is an LED. In another embodiment, colored segments 410 and 412 alternately emit colored light corresponding to the host computer 104 and 106 that has been selected by the pressing of activation button 408.

In yet another embodiment, indicator light 406 is a multicolored LED that emits two different colors of light (such as yellow and green) at alternate times to indicate when host computer 104 is selected; a first color when the host computer 104 is selected and a second color when host computer 106 is selected by the user operating the remote switches 108a-108b. The available colors correspond to the same colors as colored segments 410 and 412 and to the colored bands 402 and 404. It should be apparent to those skilled in the art that other ways of indicating two different colors on remote switches 108a and 108b that coordinate with the two alternating colors of the host computers 104 and 106 that are selected by depressing activation button 408 are possible.

Figure 5A:
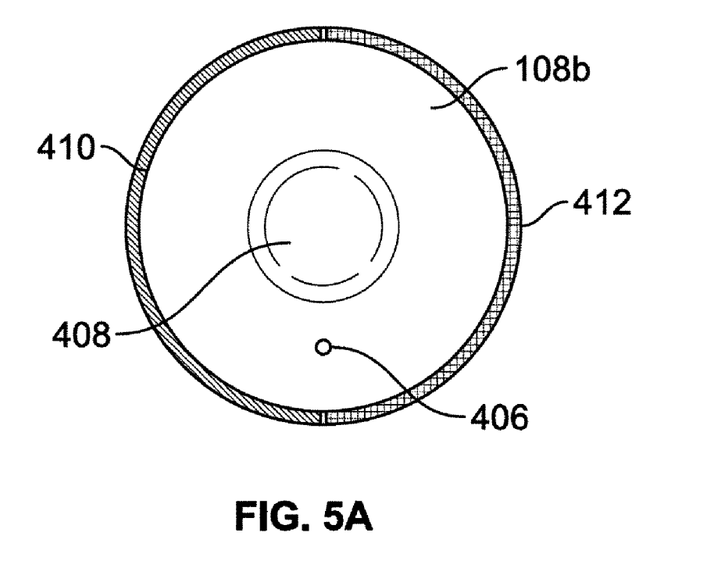
FIG. 5A is a top view of one embodiment of a remote switch that communicates with a KVMA switch in accordance with the present invention.
Figure 5B:
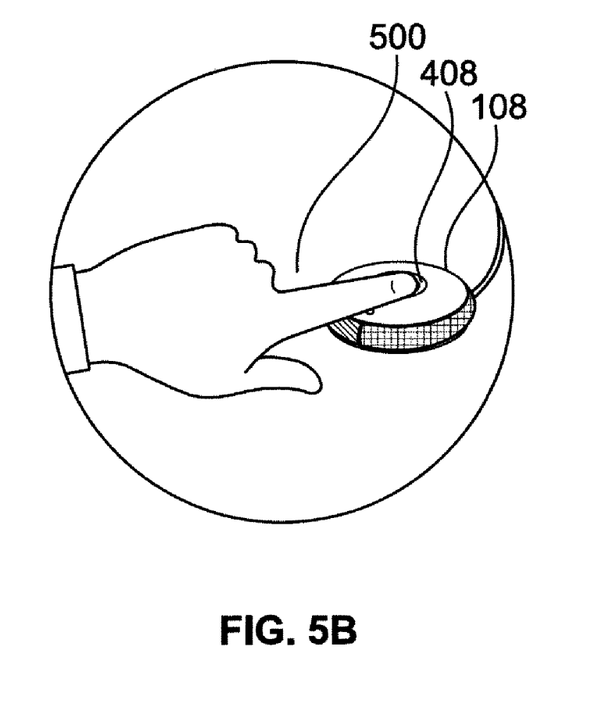
FIG. 5B is an illustration of how a remote switch is activated by a user in accordance with an exemplary embodiment of the present invention.

FIG. 5A is a top view of one embodiment of the remote switch that communicates with the KVMA switch, while FIG. 5B is an illustration of how the remote switch is activated by the user in accordance with an exemplary embodiment of the present invention. The shape of the remote switch 108a and the wireless RF remote switch 108b can be circular discs, similar to a miniature hockey puck; however, it should be appreciated by one skilled in the art that other physical shapes of the remote switches 108a and 108b as well as the placement of the colored segments 410 and 412, the indicator light 406, and the activation button 408 within the remote switches 108a-108b are possible. As shown in FIG. 5B, the user can use his or her finger 500 to depress activation button 408 to select one of the host computers 104 and 106 to be connected to user console 101 at a given point in time.

Having thus described a preferred embodiment of a system and apparatus for accessing a plurality of host computers from a single console and allowing the user to remotely switch the keyboard, video signal, mouse and audio signals from each of the host computers with an RF remote switch, it should be apparent to those skilled in the art that certain advantages of the invention have been achieved. For example, the use of color coded cables and connectors utilized with the switching device that are color coordinated with colored section of the RF remote switch for easy hook-up and utilization of the KVMA switch have been illustrated, but it should also be appreciated that various modifications, adaptations, and alternative embodiments thereof may be made within the scope and spirit of the present invention. The invention is soley defined by the following claims.

What is claimed is:

1. A computer management apparatus, comprising:
   a body;
   a switching circuit contained within the body, the switching circuit having a first state and a second state;
   a set of connector ports operatively coupled to the switching circuit and adapted to connect to respective first and second host computers;
   a first group of cables extending from the body, the first group operatively coupled to at least the switching circuit, a first keyboard port, a first mouse port, a first video port, and a first audio port;
   a second group of cables extending from the body, the second group operatively coupled to at least the switching circuit, a second keyboard port, a second mouse port, a second video port, and a second audio port; and
   a remote control device removably connected to the body via a remote control connector, the remote control device being operatively coupled to the switching circuit, the remote control device comprising:
      a device button for toggling between the first state and the second state of the switching circuit; and
      a device indicator that indicates whether the switching circuit is in the first state or the second state, the device indicator indicating a first color code when the switching circuit is in the first state, the device indicator indicating a second color code when the switching circuit is in the second state;
   wherein the first host computer operatively coupled to the first group of cables is selected when the switching circuit is in the first state and the second host computer operatively coupled to the second group of cables is selected when the switching circuit is in the second state.

2. The apparatus as recited in claim 1, further comprising a base indicator disposed on the body and operatively coupled to the switching circuit to indicate whether the switching circuit is in the first state or the second state.

3. The apparatus as recited in claim 2, wherein the base indicator indicates the first color code when the switching circuit is in the first state and the second color code when the switching circuit is in the second state.

4. The apparatus as recited in claim 1, wherein the apparatus is adapted to receive at least one of a video signal, a keyboard control signal, and a cursor control signal.

5. The apparatus as recited in claim 4, wherein the apparatus is further adapted to receive an audio signal.

6. The apparatus as recited in claim 1, wherein the apparatus is adapted to send at least one control signal to the first host computer when the switching circuit is in the first state and to the second host computer when the switching circuit is in the second state.

7. A computer management system, comprising:
   a body;
   a switching circuit contained within the body, the switching circuit having a first state and a second state;
   a set of connector ports operatively coupled to the switching circuit and adapted to connect to respective first and second host computers;
   a first group of cables extending from the body, the first group being operatively coupled to at least the switching circuit, a first keyboard port, a first mouse port, a first video port and a first audio port;
   a second group of cables extending from the body, the second group being operatively coupled to at least the switching circuit, a second keyboard port, a second mouse port, a second video port and a second audio port; and
   a remote control device in wireless communication with the switching circuit, the remote control device comprising:
      a device button for toggling between the first state and the second state of the switching circuit; and
      a device indicator that indicates whether the switching circuit is in the first state or the second state;
   wherein the first host computer operatively coupled to the first group of cables is selected when the switching circuit is in the first state and the second host computer operatively coupled to the second group of cables is selected when the switching circuit is in the second state.

8. The system as recited in claim 7, further comprising a base indicator disposed on the body and operatively coupled to the switching circuit to indicate whether the switching circuit is in the first state or the second state.

9. The system as recited in claim 8, wherein the base indicator indicates a first color code when the switching circuit is in the first state and a second color code when the switching circuit is in the second state, the first color code corresponding to a color code of the first group of cables and the second color code corresponding to a color code of the second group of cables.

10. The system as recited in claim 7, wherein the device indicator indicates a first color code when the switching circuit is in the first state and a second color code when the switching circuit is in the second state, the first color code corresponding to a color code of the first group of cables and the second color code corresponding to a color code of the second group of cables.

11. The system as recited in claim 7, wherein the system is adapted to receive at least one of a video signal, a keyboard control signal, and a cursor control signal.

12. The system as recited in claim 11, wherein the system is further adapted to receive an audio signal.

13. The system as recited in claim 7, wherein the system is adapted to send at least one control signal to the first host computer when the switching circuit is in the first state and to the second host computer when the switching circuit is in the second state.

14. The system as recited in claim 7, wherein the remote control device wirelessly communicates with the switching circuit via radio frequency signals.

15. The system as recited in claim 14, wherein the device indicator further indicates a toggle signal has been transmitted to the switching circuit.

16. A computer management system, comprising:
   a body;
   a switching circuit contained within the body, the switching circuit adapted to operate in a first mode and a second mode;
   a set of connector ports operatively coupled to the switching circuit and adapted to connect to respective first and second host computers;

a first group of cables extending from the body, the first group being operatively coupled to at least the switching circuit, a first video port and a first audio port, the first group comprising a first color code;

a second group of cables extending from the body, the second group being operatively coupled to at least the switching circuit, a second video port and a second audio port, the second group comprising a second color code; and a remote control device in communication with the switching circuit, the remote control device comprising a device indicator that indicates whether the switching circuit is in the first mode or the second mode and a device button for toggling between the first mode and the second mode of the switching circuit;

wherein the first host computer operatively coupled to the first group of cables is selected when the switching circuit is operating in the first mode and the second host computer operatively coupled to the second group of cables is selected when the switching circuit is operating in the second mode.

17. The system as recited in claim 16, further comprising a base indicator disposed on the body and operatively coupled to the switching circuit to indicate whether the switching circuit is in the first mode or the second mode.

18. The system as recited in claim 17, wherein the base indicator indicates the first color code when the switching circuit is in the first mode and the second color code when the switching circuit is in the second mode.

19. The system as recited in claim 16, wherein the device indicator indicates the first color code when the switching circuit is in the first mode and the second color code when the switching circuit is in the second mode.

20. The system as recited in claim 16, wherein the system is adapted to receive at least one of a video signal, a keyboard control signal, and a cursor control signal.

21. The system as recited in claim 20, wherein the system is further adapted to receive an audio signal.

22. The system as recited in claim 16, wherein the system is adapted to send at least one control signal to the first host computer when the switching circuit is in the first mode and to the second host computer when the switching circuit is in the second mode.

23. The system as recited in claim 16, wherein the remote control device wirelessly communicates with the switching circuit via radio frequency signals.

24. The system as recited in claim 23, wherein the device indicator further indicates that a toggle signal has been transmitted to the switching circuit.

* * * * *